US012627577B2

(12) United States Patent
Lee

(10) Patent No.: US 12,627,577 B2
(45) Date of Patent: May 12, 2026

(54) METHOD AND APPARATUS FOR NETWORK RESOURCE MANAGEMENT

(71) Applicant: Comcast Cable Communications, LLC, Philadelphia, PA (US)

(72) Inventor: Yiu L. Lee, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 379 days.

(21) Appl. No.: 17/176,102

(22) Filed: Feb. 15, 2021

(65) Prior Publication Data

US 2022/0263729 A1 Aug. 18, 2022

(51) Int. Cl.
| | |
|---|---|
| *H04L 41/5019* | (2022.01) |
| *H04L 41/0896* | (2022.01) |
| *H04L 41/5003* | (2022.01) |
| *H04L 47/722* | (2022.01) |
| *H04L 47/785* | (2022.01) |

(52) U.S. Cl.
CPC ...... *H04L 41/5019* (2013.01); *H04L 41/0896* (2013.01); *H04L 41/5003* (2013.01); *H04L 47/722* (2013.01); *H04L 47/785* (2013.01)

(58) Field of Classification Search
CPC ............. H04L 41/5019; H04L 41/0896; H04L 41/5003; H04L 47/722; H04L 47/785
USPC ....................................................... 709/223
See application file for complete search history.

(56) References Cited

U.S. PATENT DOCUMENTS

| | | | |
|---|---|---|---|
| 7,653,735 B2 | 1/2010 | Mandato et al. | |
| 7,680,922 B2 | 3/2010 | Rabinovitch et al. | |
| 8,078,553 B2 | 12/2011 | Strassner et al. | |
| 8,549,143 B2 | 10/2013 | Mandato et al. | |
| 8,705,342 B2 | 4/2014 | Yu et al. | |
| 9,038,015 B1 | 5/2015 | Allsbrook | |
| 9,973,429 B2 | 5/2018 | Lee et al. | |
| 10,165,036 B1* | 12/2018 | Gigliotti | H04L 67/10 |
| 10,389,595 B2 | 8/2019 | Houyou et al. | |
| 2005/0076339 A1 | 4/2005 | Merril et al. | |
| 2006/0072541 A1* | 4/2006 | Pecus | H04L 47/787 370/351 |
| 2011/0145153 A1 | 6/2011 | Dawson et al. | |
| 2013/0124712 A1* | 5/2013 | Parker | H04L 43/55 709/224 |
| 2014/0098673 A1 | 4/2014 | Bernstein et al. | |

(Continued)

FOREIGN PATENT DOCUMENTS

| | | |
|---|---|---|
| EP | 2018742 A1 | 1/2009 |
| EP | 2901636 A1 | 8/2015 |

(Continued)

*Primary Examiner* — Suraj M Joshi
*Assistant Examiner* — Ayele F Woldemariam
(74) *Attorney, Agent, or Firm* — BakerHostetler

(57) ABSTRACT

Systems and methods are described herein for managing network resources. A computing device may request network resources for an application and obtain a guarantee that those network resources can be provided. The computing device may use a layer in its operating system that communicates with a provider of the network resources in order to manage the network resources and obtain a guarantee that the network resources can be provided. The provider may confirm whether it can fulfill the computing device's request and may manage network traffic to guarantee that the network resources are provided.

20 Claims, 7 Drawing Sheets

600

(56) References Cited

U.S. PATENT DOCUMENTS

| | | | | |
|---|---|---|---|---|
| 2014/0122695 | A1* | 5/2014 | Kulikov | H04L 41/5054 |
| | | | | 709/224 |
| 2015/0113511 | A1 | 4/2015 | Poulin | |
| 2015/0120933 | A1* | 4/2015 | Yates | H04W 72/1236 |
| | | | | 709/226 |
| 2015/0146716 | A1 | 5/2015 | Olivier et al. | |
| 2015/0163853 | A1* | 6/2015 | In | H04L 69/14 |
| | | | | 455/73 |
| 2018/0270155 | A1 | 9/2018 | Lee et al. | |
| 2019/0230046 | A1* | 7/2019 | Djukic | H04L 47/76 |
| 2019/0306109 | A1* | 10/2019 | Masputra | H04L 63/166 |

FOREIGN PATENT DOCUMENTS

| | | |
|---|---|---|
| KR | 2009-0012564 A | 2/2009 |
| WO | 2007/134468 A1 | 11/2007 |
| WO | 2013/050890 A1 | 4/2013 |
| WO | 2014/055912 A1 | 4/2014 |
| WO | 2018/045990 A1 | 3/2018 |
| WO | 2018/196793 A1 | 11/2018 |
| WO | 2019/068251 A1 | 4/2019 |

* cited by examiner

300

400

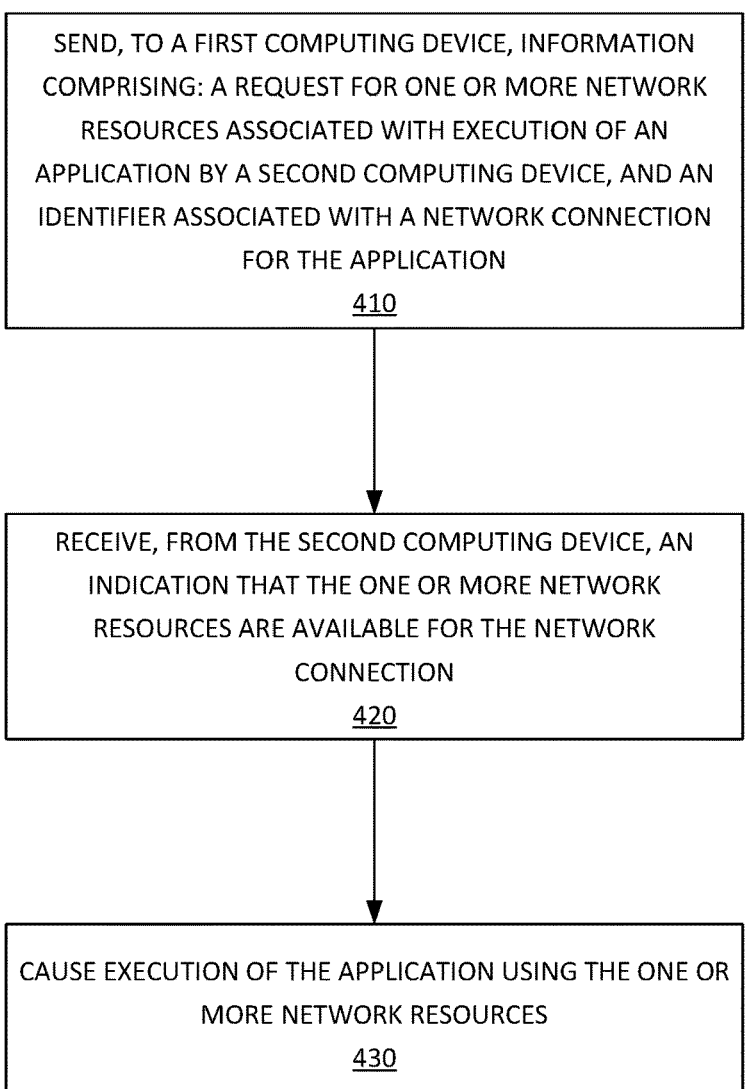

SEND, TO A FIRST COMPUTING DEVICE, INFORMATION COMPRISING: A REQUEST FOR ONE OR MORE NETWORK RESOURCES ASSOCIATED WITH EXECUTION OF AN APPLICATION BY A SECOND COMPUTING DEVICE, AND AN IDENTIFIER ASSOCIATED WITH A NETWORK CONNECTION FOR THE APPLICATION
410

RECEIVE, FROM THE SECOND COMPUTING DEVICE, AN INDICATION THAT THE ONE OR MORE NETWORK RESOURCES ARE AVAILABLE FOR THE NETWORK CONNECTION
420

CAUSE EXECUTION OF THE APPLICATION USING THE ONE OR MORE NETWORK RESOURCES
430

Figure 5:
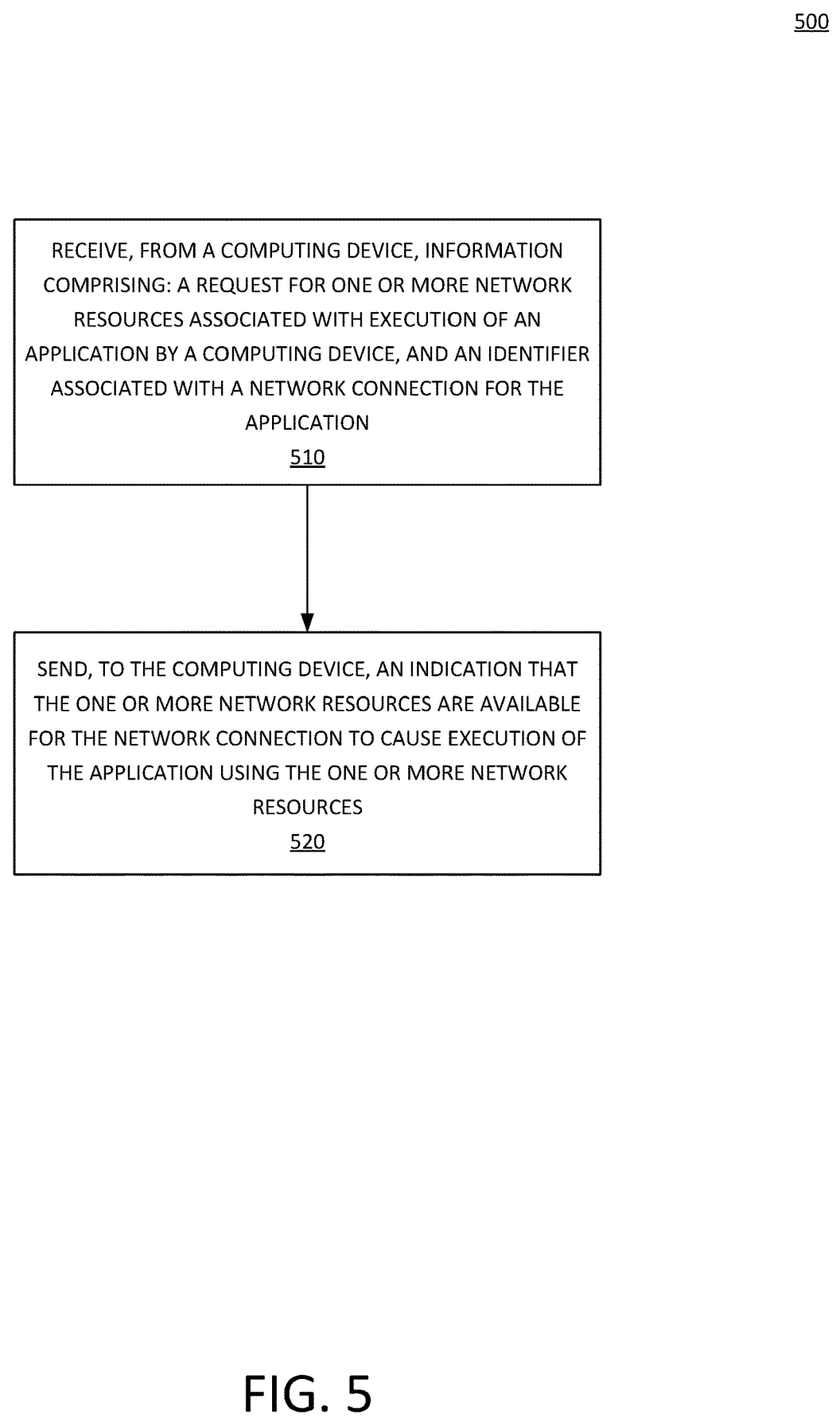

RECEIVE, FROM A COMPUTING DEVICE, INFORMATION COMPRISING: A REQUEST FOR ONE OR MORE NETWORK RESOURCES ASSOCIATED WITH EXECUTION OF AN APPLICATION BY A COMPUTING DEVICE, AND AN IDENTIFIER ASSOCIATED WITH A NETWORK CONNECTION FOR THE APPLICATION
510

SEND, TO THE COMPUTING DEVICE, AN INDICATION THAT THE ONE OR MORE NETWORK RESOURCES ARE AVAILABLE FOR THE NETWORK CONNECTION TO CAUSE EXECUTION OF THE APPLICATION USING THE ONE OR MORE NETWORK RESOURCES
520

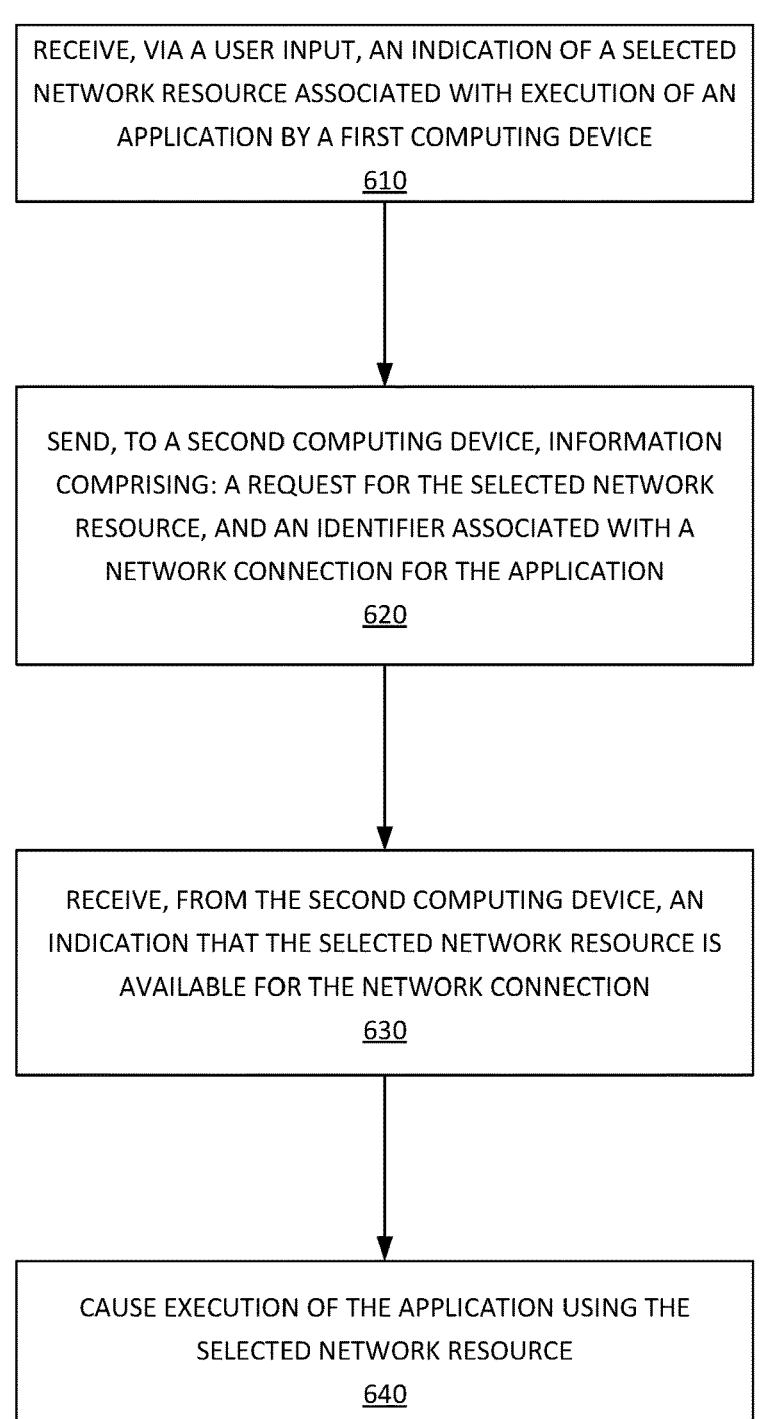

RECEIVE, VIA A USER INPUT, AN INDICATION OF A SELECTED NETWORK RESOURCE ASSOCIATED WITH EXECUTION OF AN APPLICATION BY A FIRST COMPUTING DEVICE
610

SEND, TO A SECOND COMPUTING DEVICE, INFORMATION COMPRISING: A REQUEST FOR THE SELECTED NETWORK RESOURCE, AND AN IDENTIFIER ASSOCIATED WITH A NETWORK CONNECTION FOR THE APPLICATION
620

RECEIVE, FROM THE SECOND COMPUTING DEVICE, AN INDICATION THAT THE SELECTED NETWORK RESOURCE IS AVAILABLE FOR THE NETWORK CONNECTION
630

CAUSE EXECUTION OF THE APPLICATION USING THE SELECTED NETWORK RESOURCE
640

FIG. 6

METHOD AND APPARATUS FOR NETWORK RESOURCE MANAGEMENT

BACKGROUND

Operating systems may manage some computing resources for an application. However, the application may not have a mechanism to manage network resources. Accordingly, more efficient methods for managing network resources for applications are desired.

SUMMARY

Systems and methods are described herein for managing network resources. A computing device may determine what network resources are needed or requested by an application and obtain a guarantee that those network resources can be provided. For example, a computing device may negotiate for a guaranteed bitrate or resolution for a video streaming application so that a high-quality viewing experience is guaranteed. The computing device may manage the network resources using a layer in its operating system that communicates with a provider of the network resources. The provider may confirm whether it can fulfill the computing device's request and may manage network traffic to guarantee that the network resources are provided.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings:

FIG. 4 shows an example method;
FIG. 5 shows an example method;
FIG. 6 shows an example method.

DETAILED DESCRIPTION OF ILLUSTRATIVE EMBODIMENTS

Systems and methods are described herein for managing network resources. Applications executing on a computing device may rely on the kernel layer of an operating system of the computing device to manage computing resources. The computing resources may include but are not limited to memory allocation and CPU cycle scheduling. As a result, scheduling these computing resources may be performed by the kernel layer and not managed by an application ("app"). The techniques described herein enable a computing device to determine network resources and negotiate for those network resources for an application so that the resources may be guaranteed for use by the application.

For example, a computing device may manage network resources for an application executing on the computing device. The network resources may include but are not limited to bandwidth, resolution, bitrate, latency, jitter, quantity of connections per second, or quality of service. The network resources may be managed by the operating system of the computing device. The network resources may be managed by a layer residing in the operating system of the computing device. The network resources may be managed by a network resource management layer (NRL) residing in the operating system of the computing device. The NRL may reside in a layer of the operating system. For example, the NRL may reside in the kernel layer of operating system of the computing device. Although, the term NRL may be used in the examples herein, one skilled in the art recognizes that the techniques performed by the NRL may be performed by any operating system, any operating system layer, or any other aspect of a computing device.

The computing device, executing the application, may communicate with another computing device that is associated with the application. The computing device associated with the application may provide the computing, storage, and networking resources for that application. For example, the computing device associated with the application may comprise a service provider, an Internet service provider (ISP), a data center, or an administrative network domain. The computing device associated with the application may allocate the network resources to the application. For example, the NRL may communicate with the computing device that is associated with the application in order to request network resources. The computing device associated with the application may, based on communication via the NRL, guarantee the availability of the network resources for the application.

Figure 1:
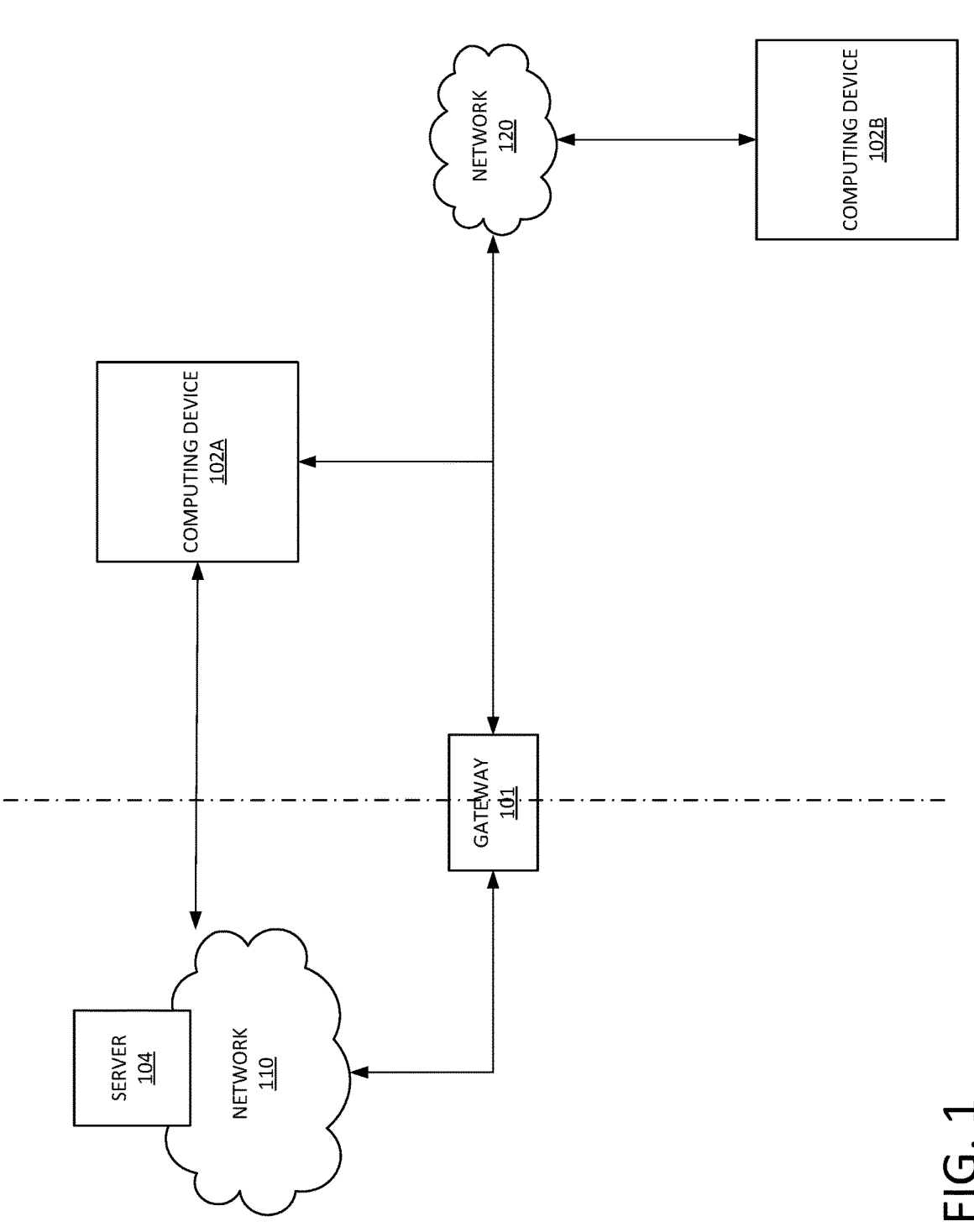
FIG. 1 shows an example system.

FIG. 1 shows an example system 100. The system may comprise computing devices 102a and 102b, a gateway 101, and a server 104. The gateway 101 may send signals via the network 110. The network 110 may comprise a network such as the Internet or any other network described herein. The server 104 may be associated with a service provider, an ISP, a data center, or an administrative network domain that provides the computing, storage, and networking resources for one or more applications. The gateway 101 may operate as a wireless local area network (WLAN) router and cable modem. The network 120 may comprise a Wi-Fi network. The network 120 may communicate using technologies such as WLAN technology based on the Institute of Electrical and Electronics Engineers (IEEE) 802.11 standards or any other appropriate technologies. The computing devices 102a and 102b may each comprise, for example, a smartphone, a tablet, a laptop computer, a handheld computer, a desktop computer, or any other computing device capable of operating in the network 110 and/or the network 120.

The computing devices 102a and 102b may be executing one or more applications. The one or more application may comprise applications may compete for network resources to fulfill user requests and complete transactions. The network resources may include but are not limited to bandwidth, resolution, bitrate, latency, jitter, quantity of connections per second, or quality of service. For example, the computing device 102a may be executing a video streaming app that competes for network bandwidth to provide an optimal bitrate version of content. The bitrate version of the content provided to the computing device 102a may be determined based on network conditions. If there is high network traffic or congestion, a content delivery network may only be able to provide a low bitrate version of the content to the computing device 102a.

For example, the computing device 102b may be executing a ride share app that competes for network resources to complete a transaction with minimal latency. The latency experienced by the computing device 102b may be based on network conditions such as congestion caused by high network traffic. The transaction may time out or not be able to be successfully fulfilled if network conditions are poor.

Figure 2:
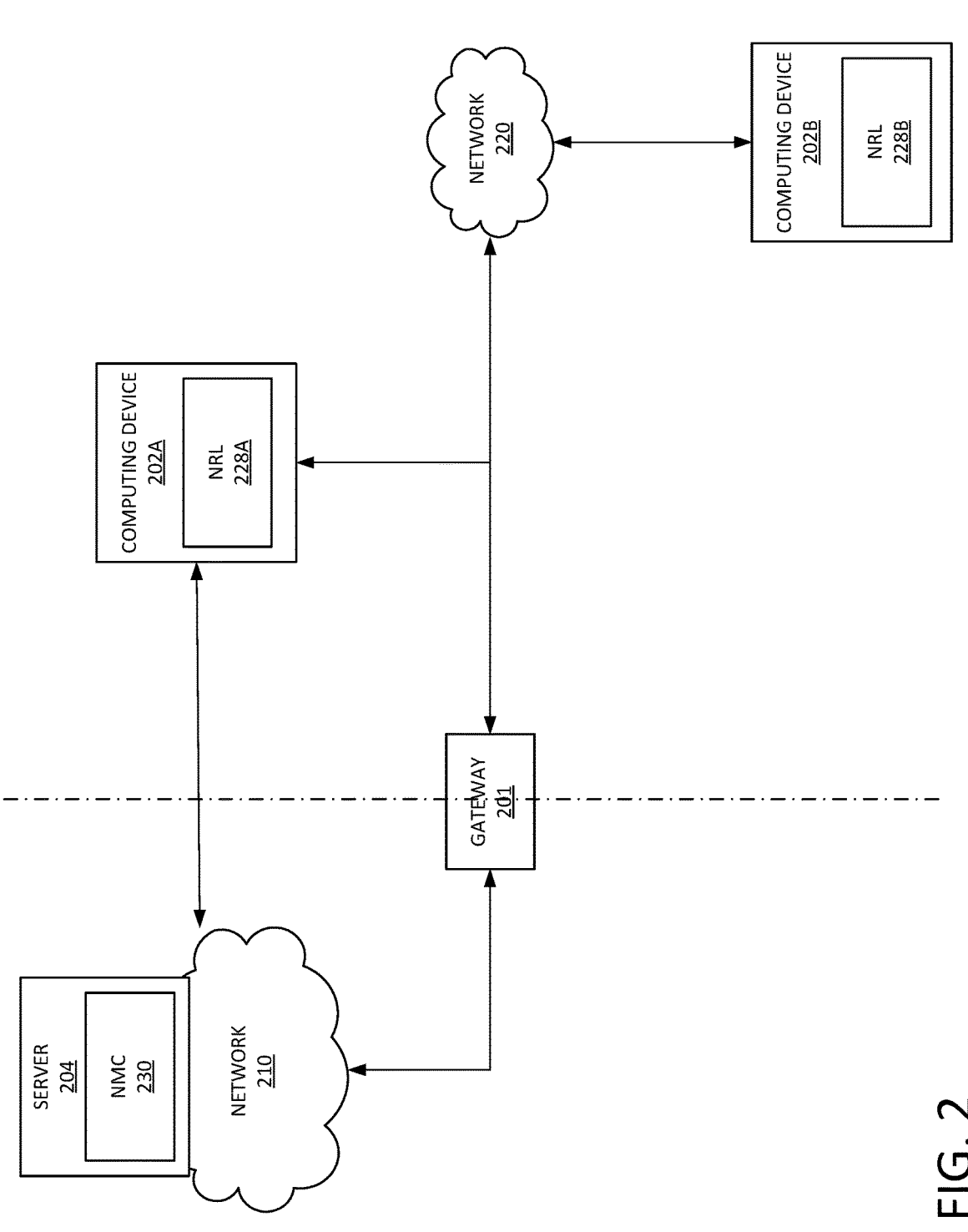
FIG. 2 shows an example system.

FIG. 2 shows an example system 200. The system may comprise computing devices 202a and 202b, a gateway 201, and a server 204. The gateway 201 may send signals via the network 210. The network 210 may comprise a network such as the Internet or any other network described herein. The gateway 201 may operate as a WLAN router and cable modem. The network 220 may comprise a Wi-Fi network. The network 220 may communicate using technologies such as WLAN technology based on the IEEE 802.11 standards or any other appropriate technologies.

The computing devices 202a and 202b may each comprise, for example, a smartphone, a tablet, a laptop computer, a handheld computer, a desktop computer, or any other computing device capable of operating in the network 210 and/or the network 220. The computing devices 202a and 202b may be executing one or more applications. The one or more application may comprise applications that compete for network resources to fulfill user requests and complete transactions. The network resources may include but are not limited to bandwidth, resolution, bitrate, latency, jitter, quantity of connections per second, or quality of service.

Each of the computing devices 202a and 202b may determine network resources associated with execution of the one or more applications. The network resources may be managed by the operating systems of the computing devices 202a and 202b. The network resources may be managed by a layer residing in each of the operating systems of the computing devices 202a and 202b. The network resources may be managed by an NRL (e.g., NRL 228a or 228b) residing in each of the operating systems of the computing devices 202a and 202b. Each NRL (e.g., NRL 228a or 228b) may reside in a layer of the operating systems of the computing devices 202a and 202b. For example, an NRL (e.g., NRL 228a or 228b) may reside in the kernel layer of an operating system of a computing device (e.g., one of the computing devices 202a or 202b). Each of the computing devices 202a and 202b may communicate with the network 210 to determine whether the determined network resources can be fulfilled. This communication may be via an NRL (e.g., NRL 228a or 228b).

For example, when an application executing on a computing device (e.g., one of the computing devices 202a or 202b) communicates with the network 210 to determine whether the determined network resources can be fulfilled, the computing device may send information indicative of the determined resources. For example, the information may comprise a request for the determined network resources and an identifier associated with a network connection for the application.

This information may be sent, for example, when the application initiates the network connection. For example, the information may be sent when the application creates a socket. This information may be sent via the NRL (e.g., NRL 228a or NRL 228b). The application may call an application programming interface (API) provided by the NRL (e.g., NRL 228a or NRL 228b) to send the information indicative of the determined resources to a computing device associated with the one or more applications. This API may be an extension of the socket API or a separate system level API. The computing device (e.g., one of the computing devices 202a or 202b) may send the information to a computing device associated with the one or more applications. For example, an application executing on the computing device (e.g., one of the computing devices 202a or 202b) may call API provided by the NRL (e.g., NRL 228a or NRL 228b) to send the information indicative of the determined resources to a computing device associated with the one or more applications. The computing device associated with the one or more applications may comprise the server 204.

The information may comprise a data structure indicative of a request for the determined network resources. For example, the data structure may be similar to one or more requested contract terms associated with the determined network resources. The information may comprise a request to communicate with a maximum latency, a minimum bandwidth, a maximum jitter, a maximum number of connections per second. The information may comprise a request to stream video with a guaranteed bitrate or resolution.

The identifier associated with a network connection for the application may be associated with network connection (e.g., with a socket created by the application). The identifier associated with a network connection for the application may be used to uniquely identify the network connection. For example, the identifier associated with a network connection for the application may be in a format that is locally significant to the NRL. For example, the identifier associated with a network connection for the application may comprise a 16-bit unsigned integer that is locally significant to the NRL. The identifier associated with a network connection may be associated with the request for with a maximum latency, a minimum bandwidth, a maximum jitter, a maximum number of connections per second.

The server 204 may be associated with a service provider, an ISP, a data center, or an administrative network domain that provides the computing, storage, and networking resources for one or more applications. The server 204 may determine network conditions such as network bandwidth, latency, jitter, or buffer size. The server 204 may determine statistics associated with these network conditions. The server 204 may determine whether the network resources requested by the computing device (e.g., one of the computing devices 202a or 202b) can be fulfilled. The server 204 may cause the requested network resources to be available or guaranteed to the computing device (e.g., one of the computing devices 202a or 202b) for the network connection indicated by the identifier. Each of the computing devices 202a and 202b may communicate with multiple servers (e.g., multiple ISPs, data centers, or administrative network domains) in order to maximize the probability of receiving the requested network resources.

For example, the server 204 may comprise a software-defined networking (SDN) controller referred to herein as a network mission control component (NMC) 230 that causes the requested network resources to be available or guaranteed to the computing device (e.g., one of the computing devices 202a or 202b) for the network connection indicated by the identifier. The server 204 may send an indication, to the computing device (e.g., one of the computing devices 202a or 202b), that the one or more network resources are available for the network connection. The NMC 230 may monitor network data and may perform instructions that apply the one or more network resources to the network connection. Each of the computing devices 202a and 202b may communicate with multiple NMCs (e.g., multiple ISPs, data centers, or administrative network domains) in order to maximize the probability of receiving the requested network resources.

For example, the indication may be sent, by the NMC 230 to the computing device (e.g., one of the computing devices 202a or 202b), indicating that the one or more network resources are available for the network connection. The indication may be generated by the server 204 only if the network resources requested by the computing device (e.g., one of the computing devices 202*a* or 202*b*) can be fulfilled. For example, the NMC 230 may only send the indication if the network resources requested by the computing device (e.g., one of the computing devices 202*a* or 202*b*) can be fulfilled. The computing device (e.g., one of the computing devices 202*a* or 202*b*) may send a notification, to the server 204, when the network resources requested by the computing device (e.g., one of the computing devices 202*a* or 202*b*), and indicated as available in the received indication, are violated. Conversely, the NMC 230 may send a notification to the computing device (e.g., one of the computing devices 202*a* or 202*b*) when a network event has impacted the guaranteed network resource.

For example, the computing device 202*a* may be executing a video streaming app that competes for network bandwidth to provide an optimal bitrate version of content. The computing device 202*a* may determine one or more network resources associated with execution of the video streaming app. For example, the determination may be based on a user selection in which a user selects a particular bitrate version or resolution for the video content. For example, the user may select a 4K resolution. The computing device 202*a* may communicate with the network 210 to determine whether the selected 4K resolution can be fulfilled. This communication may be via the NRL 228*a* residing in the operating system of the computing device 202*a*. The computing device 202*a* may send information indicative of the selected 4K resolution. For example, the information may comprise a request to deliver 4K resolution content and an identifier associated with a network connection for the video streaming application. This information may be sent, for example, when the video streaming application initiates the network connection. For example, the information may be sent when the video streaming application creates a socket. This information may be sent via the NRL 228*a*. The video streaming application may call an API provided by the NRL 228*a*. This API may be an extension of the socket API or a separate system level API. The server 204 may be associated with an ISP or a data center that provides the content. The server 204 may determine whether the 4K resolution content requested by the computing device may be delivered. An indication may be sent, by the NMC 230 to the computing device 202*a* indicating that the 4K resolution content is available for the network connection. The computing device 202*a* may then playback the video at with a guaranteed 4K resolution. The NMC 230 may monitor network data and may perform instructions to provide the guaranteed 4K resolution.

The information, comprising a request for the determined network resources and identifier associated with a network connection for the application, may comprise a data structure indicative of the request. The data structure may be determined by the server 204. For example, the data structure may be determined by the NMC 230 of the server 204.

The NRL (e.g., NRL 228*a* or NRL 228*b*) may register with the NMC 230. The registration may be based on a namespace comprising the identifier associated with a network connection for the application. For example, the namespace may comprise a globally unique namespace comprising the identifier associated with a network connection for the application such as ADNAME/NETWORK/ UUID/WEBSERVER/IDENTIFIER/10001. The AD name may comprise the name of an ISP, a data center, or an enterprise (e.g., a financial institution, a public cloud provider or a content provider). The UUID may comprise a NRL unique identifier. For example, the NRL unique identifier may comprise the UUID of the operation system or may be pre-loaded by developer of the application requesting the resources. The registration process may register the namespace with an Internet Protocol address (IP) address to communicate with the NRL.

The NRL (e.g., NRL 228*a* or NRL 228*b*) may generate a digital certificate that is associated with the namespace for security purposes since the NMC is a critical resource. In order to prevent, for example a distributed denial-of-service (DDoS) attack from NRL, registration may use the digital certificate. For example, when the NRL (e.g., NRL 228*a* or NRL 228*b*) tries to bind to the NMC 230, it may send a register message to the NMC 230. The register message may comprise a one-time certificate created by the namespace digital certificate. The NMC 230 may determine a mapping and cache the IP address of the register message. If NRL (e.g., NRL 228*a* or NRL 228*b*) loses the connection to the NMC 230, it may regenerate a new one-time certificate to reestablish a new connection.

The NRL (e.g., NRL 228*a* or NRL 228*b*) may register a callback function with the NMC 230. The callback function may enable the NMC 230 so that the NMC 230 may call the NRL (e.g., NRL 228*a* or NRL 228*b*) for events. An event may include a violation of the guaranteed resources as described above. When NRL (e.g., NRL 228*a* or NRL 228*b*) receives an event from NMC 230, the NRL (e.g., NRL 228*a* or NRL 228*b*) may send a signal (e.g., SIGNET stands for Network Signal) to the application with the associated identifier associated with a network connection. The application may receive the event and act upon the event.

Figure 3:
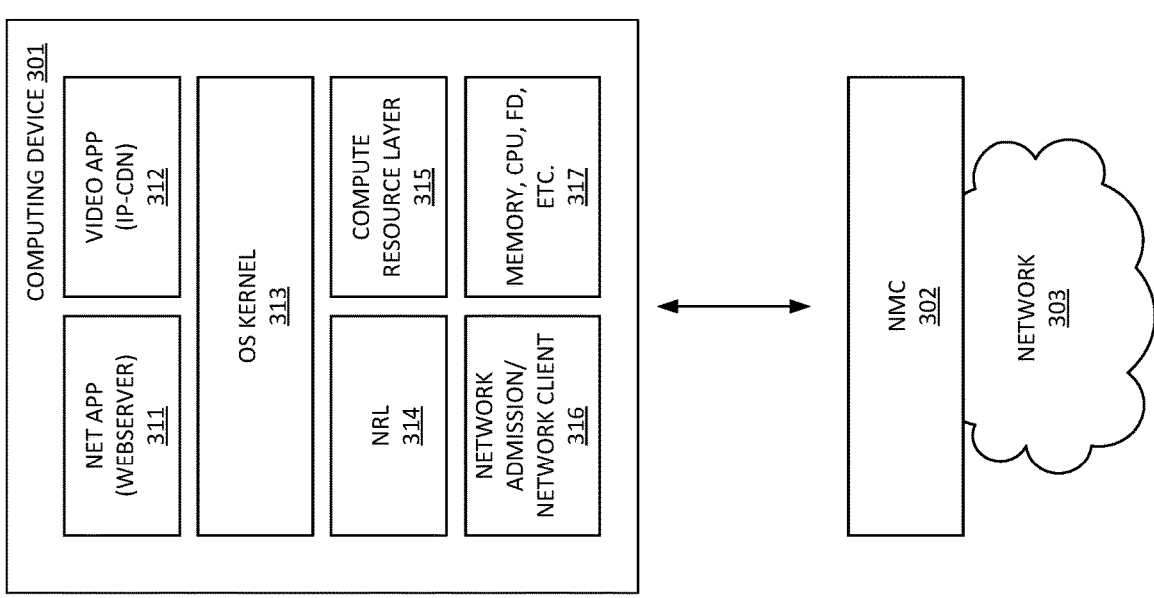
FIG. 3 shows an example system.

FIG. 3 shows an example system 300. The system may be configured to manage, via an NRL and NMC, network resources. The computing device 301 may comprise, for example, a smartphone, a tablet, a laptop computer, a handheld computer, a desktop computer, or any other computing device capable of operating in a network 303. A computing device 301 may be executing one or more applications. For example, the one or more applications may comprise net app 311 and video app 312. The computing device 301 may comprise an OS kernel 313 managing a computing resource layer 315 and various computing resources such as memory, a central processing unit (CPU), and a file descriptor (FD) 317. The computing device 301 may comprise a network admission/network client 316. The computing device 301 may comprise an NRL 314 as described herein that communicates with an NMC 302 in a network 303.

The computing device 301 may determine one or more network resources associated with execution of the net app 311 or the video app 312. The one or more network resources may comprise, for example, bandwidth, resolution, bitrate, latency, jitter, quantity of connections per second, or quality of service. The computing device 301 may communicate with the network 303 to determine whether the determined network resources can be fulfilled. This communication may be via NRL 314. For example, when the computing device 301 communicates with the network 303 to determine whether the determined network resources can be fulfilled, the computing device 301 may send information indicative of the determined resources via the NRL 314. For example, the information may comprise a request for the determined network resources and an identifier associated with a network connection for the net app 311 or the video app 312. This information may be sent, for example, when the net app 311 or the video app 312 initiates the network connection. For example, the information may be sent when the net app 311 or the video app 312 creates a socket. The net app 311 or the video app 312 may call an API provided by the NRL 314. This API may be an extension of the socket API or a separate system level API.

The information may be sent to an NMC 302 associated with an ISP or a data center that provides the computing, storage, and networking resources for the net app 311 or the video app 312. The NMC 302 may determine network conditions such as network bandwidth, latency, jitter, or buffer size. The NMC 302 may determine statistics associated with these network conditions. The NMC 302 may determine whether the network resources requested by the computing device 301 can be fulfilled. The NMC 302 may cause the requested network resources to be available or guaranteed to the computing device 301 for the network connection indicated by the identifier. The computing device 301 may communicate with multiple NMCs 302 (e.g., multiple ISPs or data centers) in order to maximize the probability of receiving the requested network resources. The NMC 302 may send an indication, to the computing device 301, that the one or more network resources are available for the network connection. The indication may be generated by the NMC 302 only if the network resources requested by the computing device 301 can be fulfilled.

FIG. 4 shows an example method 400. The method 400 of FIG. 4, may be performed by any device, for example, by any of the devices depicted in FIGS. 1-3 or described herein. While each step in the method 400 of FIG. 4 is shown and described separately, multiple steps may be executed in a different order than what is shown, in parallel with each other, or concurrently with each other. At step 410, information may be sent to a first computing device. The first computing device may be associated with at least one of: a data center, an ISP, or a network administrative domain. The first computing device may monitor network data and may perform instructions to apply the one or more network resources to the network connection. The information may comprise a request for one or more network resources. The information may comprise an identifier associated with a network connection for an application. The one or network resources may be associated with execution of the application by a second computing device.

The one or more network resources may comprise at least one of: a minimum bandwidth, a minimum buffer allocation, a maximum number of connections, a resolution, a number of network hops, jitter, or a latency. The one or more network resources may have been determined by an NRL in response to an API called by the application. The NRL may reside in a kernel layer of an operating system of the second computing device. The one or more network resources may have been determined based on a user input indicating a selection of a network resource of the one or more network resources. For example, the application may comprise a video streaming app, and the network resource may comprise at least one of: a guaranteed resolution for video content or a guaranteed bandwidth for network connection.

At step 420, an indication may be received from the first computing device. The indication may indicate that the one or more network resources are available for the network connection. For example, if the application streams video content, the indication may indicate that the one or more network resources comprises at least one of: a guaranteed resolution for the video content or a guaranteed bandwidth for the network connection. For example, the indication may indicate that the one or more network resources comprise a guaranteed latency for responding to a transaction request using the network connection. The indication may be output by the second computing device. For example, the indication may be displayed by the second computing device. At step

430, execution of the application using the one or more network resources may be caused.

FIG. 5 shows an example method 500. The method 500 of FIG. 5, may be performed by any device, for example, by any of the devices depicted in FIGS. 1-3 or described herein. While each step in the method 500 of FIG. 5 is shown and described separately, multiple steps may be executed in a different order than what is shown, in parallel with each other, or concurrently with each other. At step 510, information may be received from a computing device. The information may comprise a request for the one or more network resources. The information may comprise an identifier associated with a network connection for the application. The one or network resources may be associated with execution of an application by the computing device. The one or more network resources may comprise at least one of: a minimum bandwidth, a minimum buffer allocation, a maximum number of connections, a resolution, a number of network hops, jitter, or a latency. The one or more network resources may have been determined by an NRL in response to an API called by the application. The NRL may reside in a kernel layer of an operating system of the computing device. The one or more network resources may have been determined based on a user input indicating a selection of a network resource of the one or more network resources. For example, the application may comprise a video streaming app, and the network resource may comprise at least one of: a guaranteed resolution for video content or a guaranteed bandwidth for network connection.

At step 520, an indication may be sent to the computing device. The indication may indicate that the one or more network resources are available for the network connection. For example, if the application streams video content, the indication may indicate that the one or more network resources comprises at least one of: a guaranteed resolution for the video content or a guaranteed bandwidth for the network connection. For example, the indication may indicate that the one or more network resources comprise a guaranteed latency for responding to a transaction request using the network connection. The indication may cause execution of the application using the one or more network resources may be caused.

FIG. 6 shows an example method 600. The method 600 of FIG. 6, may be performed by any device, for example, by any of the devices depicted in FIGS. 1-3 or described herein. While each step in the method 600 of FIG. 6 is shown and described separately, multiple steps may be executed in a different order than what is shown, in parallel with each other, or concurrently with each other. At step 610, an indication of a selected network resource may be received via a user input. The selected network resource may be associated with execution of an application by a first computing device. The selected network resource may comprise at least one of: a minimum bandwidth, a minimum buffer allocation, a maximum number of connections, a resolution, a number of network hops, jitter, or a latency. The selected network resource may have been determined by an NRL in response to an API called by the application. The NRL may reside in a kernel layer of an operating system of the first computing device. For example, the application may comprise a video streaming app, and the network resource may comprise at least one of: a guaranteed resolution for video content or a guaranteed bandwidth for network connection.

At step 620, information may be sent to a second computing device. The information may comprise a request for the selected network resource. The information may comprise an identifier associated with a network connection for the application. The second computing device may be associated with at least one of: a data center, an ISP, or a network administrative domain. The second computing device may monitor network data and may perform instructions to apply the one or more network resources to the network connection.

At step 630, an indication may be received from the second computing device. The indication may indicate that the selected network resource is available for the network connection. For example, if the application streams video content, the indication may indicate that the selected network resource comprises at least one of: a guaranteed resolution for the video content or a guaranteed bandwidth for the network connection. For example, the indication may indicate that the selected network resource comprises a guaranteed latency for responding to a transaction request using the network connection. The indication may be output by the first computing device. For example, the indication may be displayed by the first computing device. At step 640, execution of the application using the selected network resource may be caused.

Figure 7:
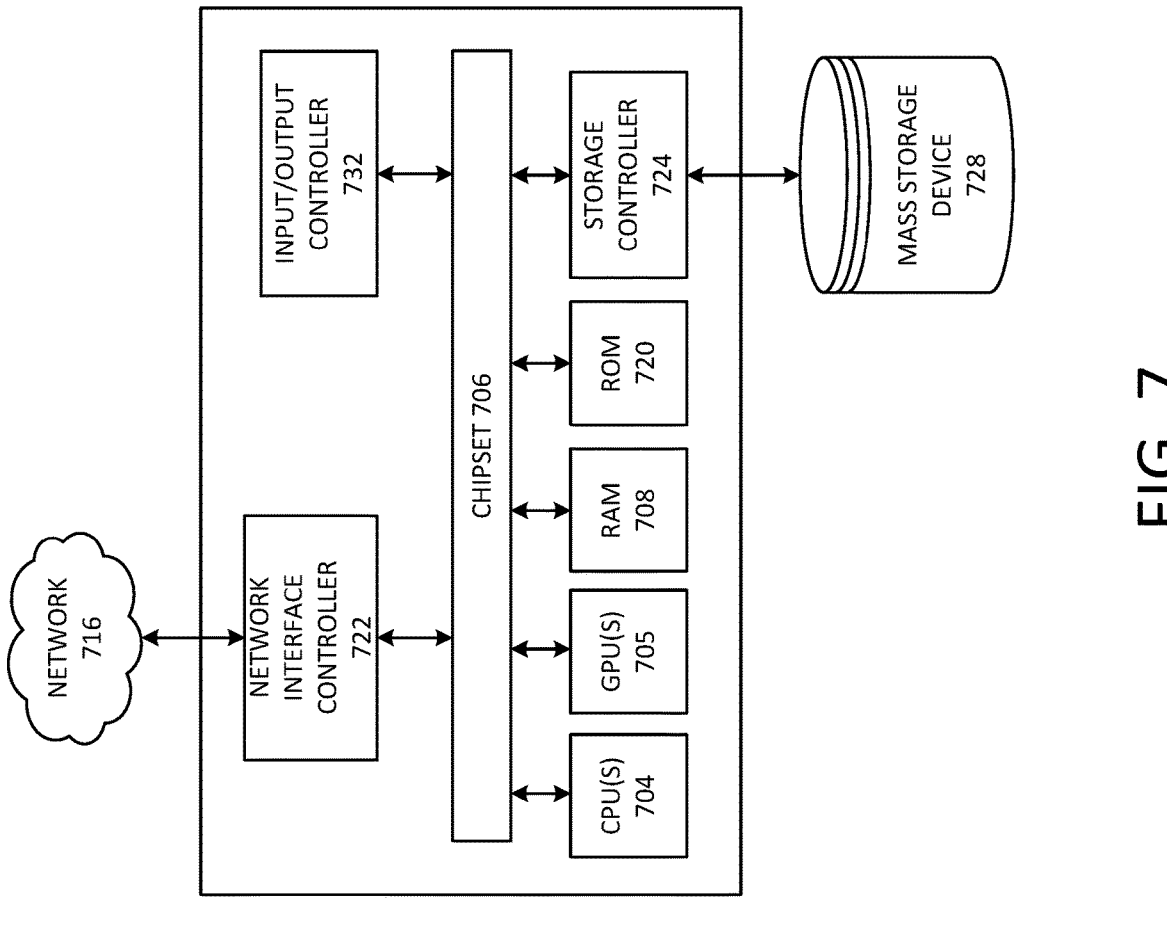
FIG. 7 shows an example computing device.

FIG. 7 depicts a computing device that may be used in various aspects, such as the servers, modules, and/or devices depicted in FIGS. 1-6. Each device depicted in FIGS. 1-6 may be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 1-6.

The computing device 700 may comprise a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the mass storage device 728 by detecting the physical states or characteristics of one or more particular locations within the physical storage units.

In addition to the mass storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 1-6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes¬from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
sending, to a first computing device, information comprising:
a request for one or more network resources associated with execution of an application by a second computing device, and
an identifier associated with a network connection for the application;
receiving, from the first computing device, an indication that the one or more network resources are available for the network connection; and
causing execution of the application using the one or more network resources.

2. The method of claim 1, wherein the one or more network resources comprise at least one of: a minimum bandwidth, a minimum buffer allocation, a maximum number of connections, a resolution, a number of network hops, jitter, or a latency.

3. The method of claim 1, wherein the application streams video content, and wherein the indication indicates that the one or more network resources comprise at least one of: a guaranteed resolution for the video content or a guaranteed bandwidth for the network connection.

4. The method of claim 3, wherein the video content is provided by the application in one or more formats, wherein each format of the one or more formats is associated with a level of quality.

5. The method of claim 1, wherein the indication indicates that the one or more network resources comprise a guaranteed latency for responding to a transaction request using the network connection.

6. The method of claim 1, wherein the causing execution is based on a user input indicating a selection of a network resource of the one or more network resources, wherein the network resource comprises at least one of: a guaranteed resolution for the video content or a guaranteed bandwidth for the network connection.

7. The method of claim 1, wherein the first computing device is associated with at least one of: a data center, an Internet service provider (ISP), or a network administrative domain; and wherein the first computing device monitors network data and performs instructions to apply the one or more network resources to the network connection.

8. The method of claim 1, further comprising:
causing, via a user interface of the second computing device, display of the indication.

9. The method of claim 1, further comprising:
determining, by a network resource layer associated with the second computing device, the one or more network resources associated with the execution of the application.

10. The method of claim 9, wherein the network resource layer resides in a kernel layer of an operating system of the second computing device.

11. The method of claim 9, wherein the information further comprises a registration request to register the network resource layer with the first computing device.

12. A method comprising:
receiving, from a computing device, information comprising:
a request for one or more network resources associated with execution of an application by the computing device, and
an identifier associated with a network connection for the application; and
sending, to the computing device, an indication that the one or more network resources are available for the network connection to cause execution of the application using the one or more network resources.

13. The method of claim 12, wherein the one or more network resources comprise at least one of: a minimum bandwidth, a minimum buffer allocation, a maximum number of connections, a resolution, a number of network hops, jitter, or a latency.

14. The method of claim 12, wherein the application streams video content, and wherein the indication indicates that the one or more network resources comprise at least one of: a guaranteed resolution for the video content or a guaranteed bandwidth for the network connection.

15. The method of claim 12, wherein the indication indicates that the one or more network resources comprise a guaranteed latency for responding to a transaction request using the network connection.

16. The method of claim 12, wherein the request is determined, by a network resource layer associated with the computing device, wherein the network resource layer resides in a kernel layer of an operating system of the computing device.

17. A method comprising:
receiving, via a user input, an indication of a selected network resource associated with execution of an application by a first computing device;
sending, to a second computing device, information comprising:
a request for the selected network resource, and
an identifier associated with a network connection for the application;
receiving, from the second computing device, an indication that the selected network resource is available for the network connection; and
causing execution of the application using the selected network resource.

18. The method of claim 17, wherein the application streams video content, and wherein the indication indicates that the selected network resource comprises at least one of: a guaranteed resolution for the video content or a guaranteed bandwidth for the network connection.

19. The method of claim 17, wherein the indication indicates that the selected network resource comprises a guaranteed latency for responding to a transaction request using the network connection.

20. The method of claim 17, wherein the second computing device is associated with at least one of: a data center, an Internet service provider (ISP), or a network administrative domain; and wherein the second computing device monitors network data and performs instructions to apply the one or more network resources to the network connection.

* * * * *